(12) United States Patent
Steffenhagen et al.

(10) Patent No.: US 10,352,805 B2
(45) Date of Patent: Jul. 16, 2019

(54) LOAD-MEASURING HYDRAULIC CYLINDER

(71) Applicant: National Oilwell Varco, L.P., Houston, TX (US)

(72) Inventors: Timothy S. Steffenhagen, Fort Worth, TX (US); William Benjamin White, Bedford, TX (US)

(73) Assignee: National Oilwell Varco, L.P., Houston, TX (US)

(*) Notice: Subject to any disclaimer, the term of this patent is extended or adjusted under 35 U.S.C. 154(b) by 316 days.

(21) Appl. No.: 15/334,981

(22) Filed: Oct. 26, 2016

(65) Prior Publication Data

US 2018/0113043 A1 Apr. 26, 2018

(51) Int. Cl.
*G01L 19/04* (2006.01)

(52) U.S. Cl.
CPC .................................. *G01L 19/04* (2013.01)

(58) Field of Classification Search
None
See application file for complete search history.

(56) References Cited

U.S. PATENT DOCUMENTS

| | | | |
|---|---|---|---|
| 3,910,364 A | 10/1975 | Baker | |
| 4,016,764 A * | 4/1977 | Rice | G01L 9/0072 361/283.4 |
| 4,655,087 A * | 4/1987 | Rozniecki | G01L 19/04 73/708 |
| 4,673,035 A | 6/1987 | Gipson | |
| 5,226,315 A * | 7/1993 | Bartscher | B60C 23/0408 73/48 |
| 6,059,029 A | 5/2000 | Goode | |
| 6,142,406 A | 11/2000 | Newman | |
| 6,830,101 B2 | 12/2004 | Saheta et al. | |
| 6,931,933 B2 * | 8/2005 | Wilson | G01L 19/04 166/368 |
| 8,857,169 B2 * | 10/2014 | Takahashi | E02F 9/2225 60/422 |

(Continued)

FOREIGN PATENT DOCUMENTS

| | | |
|---|---|---|
| GB | 2457585 | 8/2009 |
| WO | 2011079218 | 6/2011 |
| WO | 2014163508 | 10/2014 |

OTHER PUBLICATIONS

International Search Report and Written Opinion for corresponding PCT Application No. PCT/US2014/060736 (11 pages).

(Continued)

*Primary Examiner* — Peter J Macchiarolo
*Assistant Examiner* — Jermaine L Jenkins
(74) *Attorney, Agent, or Firm* — Jonathan Pierce; Porter Hedges LLP (57) ABSTRACT

A hinged structure includes a hinge that is actuatable using a hydraulic cylinder. A method of monitoring a load applied to the hinged structure involves leaking the hydraulic fluid from the hydraulic cylinder in a way that compensates for expansion of the hydraulic fluid caused by variations in temperature of the hydraulic fluid. The method further involves measuring the pressure of the hydraulic fluid in the hydraulic cylinder. The hydraulic cylinder may be part of a coiled tubing injector. The load applied to the hydraulic cylinder may be used to indicate an overload of the tubing guide.

19 Claims, 4 Drawing Sheets

(56) References Cited

U.S. PATENT DOCUMENTS

| | | | |
|---|---|---|---|
| 9,574,952 B2* | 2/2017 | Schintee | G01L 9/0001 |
| 2002/0125014 A1 | 9/2002 | Dearing | |
| 2007/0246261 A1 | 10/2007 | Lowe | |
| 2013/0048270 A1 | 2/2013 | Havinga | |
| 2017/0184137 A1* | 6/2017 | Stanford | F15B 15/1433 |

OTHER PUBLICATIONS

Drawing of a coiled tubing injector that was on sale on or before Oct. 15, 2012 (1 pg.).

* cited by examiner

LOAD-MEASURING HYDRAULIC CYLINDER

CROSS-REFERENCE TO RELATED APPLICATIONS

None

BACKGROUND

This disclosure relates to methods and apparatus for measuring the load applied to a hydraulic cylinder by using a pressure sensor. The hydraulic cylinder may be part of a coiled tubing injector having a tubing guide. The load applied to the hydraulic cylinder may be used to indicate overload of the tubing guide.

When the load applied to the piston rod of the hydraulic cylinder is sufficient to overcome the pressure in the hydraulic cylinder, the piston moves away from the piston head (or the piston base) and compresses the hydraulic fluid in the chamber. The change in pressure is related to the load applied to the piston rod. The change in pressure can be detected using a pressure sensor connected to the cylinder.

False readings of the load applied to the piston rod may occur. Those false readings can be attributed to thermal expansion of the hydraulic fluid in the cylinder that causes an increase of the measured pressure, even in the absence of load increase applied to the piston rod. Thermal expansion may occur due to changes in the ambient temperature throughout the work day, or heating by other parts in contact with the hydraulic fluid.

Thus, there is a continuing need in the art for methods and apparatus for measuring the load applied to a hydraulic cylinder with a pressure sensor. These methods and apparatus preferably compensate for thermal expansion effects and improve readings of the load applied to the piston rod.

BRIEF SUMMARY OF THE DISCLOSURE

The disclosure describes load-measuring actuators including a hydraulic cylinder. The hydraulic cylinder has a variable chamber. The variable chamber is delimited by a piston reciprocally disposed in the hydraulic cylinder. The variable chamber may be located on the cap side of the hydraulic cylinder.

The load-measuring actuators disclosed herein may comprise a constant-pressure supply of hydraulic fluid. The constant-pressure supply may be connected to the variable chamber through a first check valve. The first check valve may be a normally-closed, pilot-to-open check valve. The first check valve may be coupled to the variable chamber via a first flowline. The first check valve may prevent the flow of hydraulic fluid out of the variable chamber when in the closed position. In some embodiments, the constant-pressure supply of hydraulic fluid may comprise a source of pressurized hydraulic fluid and an accumulator. The accumulator may be intermittently coupled to the source of pressurized hydraulic fluid through a second check valve. The first and second check valves may be coupled by a second flowline. The accumulator may be coupled to the second flowline. The constant-pressure supply of hydraulic fluid may further comprise a reducing valve for regulating the pressure of the supplied hydraulic fluid.

The load-measuring actuators disclosed herein may further comprise a pressure sensor. The pressure sensor may be coupled to the variable chamber by a pressure path. The pressure path may couple the pressure sensor to one of the variable chamber or the first flowline.

The load-measuring actuators disclosed herein may further comprise a restricted flow orifice. The restricted flow orifice may continuously leak hydraulic fluid from the variable chamber. The restricted flow orifice may be coupled to one of the variable chamber, the first flowline, and the pressure path. In some embodiments, the restricted flow orifice may comprise a variable orifice valve such as a needle valve.

In another aspect, the load-measuring actuators described herein may comprise a flowpath capable of leaking hydraulic fluid from the variable chamber and an obturator operatively coupled to the piston. The obturator may be configured to open the flowpath when the piston is located between a first position, which is recessed from an end-of-stroke position of the piston, and the end-of-stroke position. As such, thermal expansion of the hydraulic fluid in the chamber may not cause the piston to reach the end-of-stroke position.

In some embodiments, the obturator may comprise a position sensor, a valve, and a controller. The position sensor may be operatively coupled to the piston to measure a position of the piston. The valve may be located in the flowpath to control the flow of hydraulic fluid from the variable chamber. The controller may be configured to actuate the valve when the position sensor indicates that the piston is located between the first position and the end-of-stroke position.

Alternatively, the obturator may comprise a check valve and a pin The flowpath may extend through the piston, and the check valve may be biased to close the flowpath. The pin may be formed in the cylinder. The pin may be sized to press against the check valve when the piston is located between the first position and the end-of-stroke position.

Still alternatively, the obturator may comprise a seal carried by the piston. The seal may seal a port that is located on a wall of the cylinder from the hydraulic fluid in the variable chamber when the piston is located between the first position and the end-of-stroke position. The port may be exposed to hydraulic fluid in the variable chamber when the piston is located between the first position and the end-of-stroke position.

The disclosure also describes methods of monitoring a load applied to a hydraulic cylinder, wherein the hydraulic cylinder is used as an actuator.

As disclosed herein, the methods of monitoring the load applied to a hydraulic cylinder may comprise supplying hydraulic fluid at a constant pressure level to a chamber of the hydraulic cylinder. In some embodiments, supplying the hydraulic fluid to the chamber may comprise the steps of intermittently supplying the hydraulic fluid from a source to an accumulator, preventing flow back from the accumulator toward the source; and connecting the accumulator to the chamber of the hydraulic cylinder to supply the hydraulic fluid at the constant pressure level.

As disclosed herein, the methods of monitoring the load applied to a hydraulic cylinder may further comprise continuously leaking the hydraulic fluid from the chamber. The hydraulic fluid is leaked at a rate sufficient to compensate for expansion of the hydraulic fluid caused by variations in temperature of the hydraulic fluid. Continuously leaking the hydraulic fluid may comprise flowing the hydraulic fluid through a restricted flow orifice or a needle valve. In some embodiments, the methods may further comprise adjusting the flow of hydraulic fluid through the restricted flow orifice.

As disclosed herein, the methods of monitoring the load applied to a hydraulic cylinder may further comprise measuring the pressure of the hydraulic fluid in the chamber and detecting whether the measured pressure exceeds the constant pressure level of the hydraulic fluid supplied to the chamber.

As disclosed herein, the methods of monitoring the load applied to a hydraulic cylinder may comprise trapping the hydraulic fluid in the chamber, optionally behind a check valve. In such cases, the hydraulic fluid continuously leaked from the chamber may include hydraulic fluid trapped behind the check valve, and the pressure measured in the chamber may be the pressure of the hydraulic fluid trapped behind the check valve.

In another aspect, the methods of monitoring the load applied to a hydraulic cylinder may comprise supplying hydraulic fluid to a variable chamber of the hydraulic cylinder to move a piston toward an end-of-stroke position of the piston. The hydraulic fluid may leak from the variable chamber whenever the piston is located between a first position, which is recessed from the end-of-stroke position, and the end-of-stroke position. As such, thermal expansion of the hydraulic fluid in the chamber may not cause the piston to reach the end-of-stroke position.

In some embodiments, the methods of monitoring the load applied to a hydraulic cylinder may further comprise measuring a position of the piston using a sensor. A flowpath fluidly coupled to the variable chamber may be selectively opened based on a comparison between the measured position and the first position. A valve obturating the flowpath may be actuated to leak the hydraulic fluid from the variable chamber.

Alternatively, a flowpath may be provided through the piston. The flowpath may include an obturator biased to close the flowpath. A pin formed in the cylinder may be pressed against the obturator when the piston is located between the first position and the end-of-stroke position. The flowpath may be opened to leak the hydraulic fluid from the variable chamber when the pin is pressed against the obturator.

Still alternatively, a flowpath may be provided through a wall of the cylinder. The flowpath may be sealed from to the hydraulic fluid in the variable chamber with the piston. The flowpath may be connected to the hydraulic fluid in the variable chamber to leak the hydraulic fluid from the variable chamber when the piston is located between the first position and the end-of-stroke position.

BRIEF DESCRIPTION OF THE DRAWINGS

For a more detailed description of the embodiments of the disclosure, reference is made to the accompanying drawings, wherein.

DETAILED DESCRIPTION

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may not be exact unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
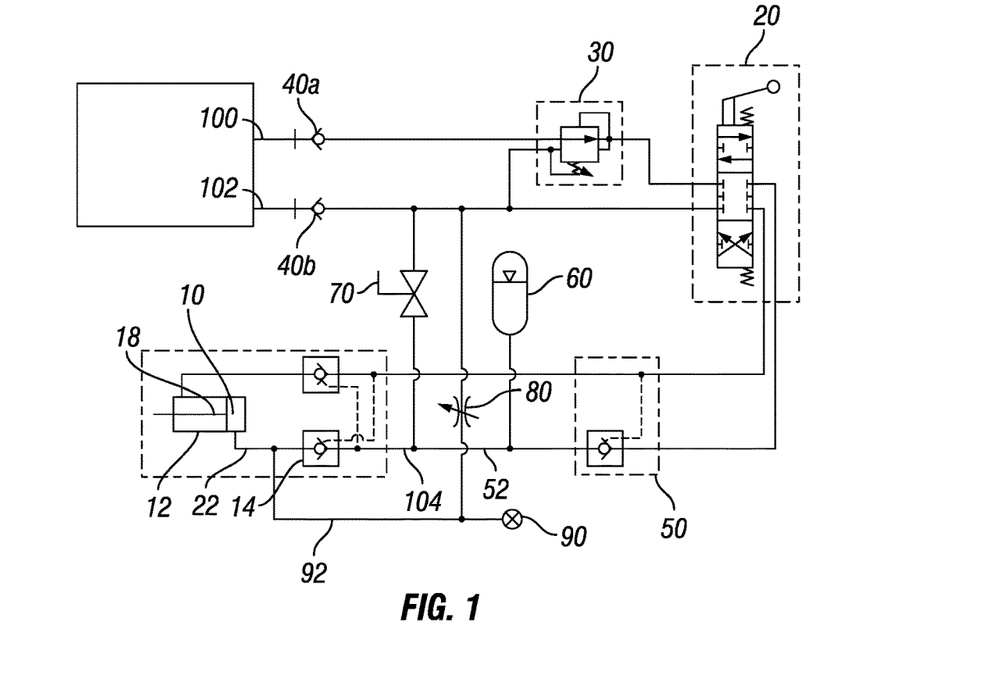
FIG. 1 is a schematic of a hydraulic circuit, including a hydraulic cylinder used as an actuator, a pressure sensor for monitoring a load applied to the hydraulic cylinder, and a constant-pressure supply comprising a source of pressurized hydraulic fluid and an accumulator.

FIG. 1 shows an example load-measuring actuator including a hydraulic cylinder 12. The load-measuring actuator is connected to a source 100 of pressurized hydraulic fluid and to a drain 102, for example with quick-connects 40a and 40b. The hydraulic cylinder 12 has a variable chamber 10. The variable chamber 10 is delimited by a piston 18 reciprocally disposed in the hydraulic cylinder 12. The variable chamber 10 may be located on the cap side of the hydraulic cylinder 12.

The load-measuring actuator shown in FIG. 1 comprises a constant-pressure supply 104 of hydraulic fluid. The constant-pressure supply 104 is connected to the variable chamber 10 through a first check valve 14. The first check valve 14 may be a normally-closed, pilot-to-open check valve. The first check valve 14 may be coupled to the variable chamber 10 via a first flowline 22. The first check valve 14 may prevent the flow of hydraulic fluid out of the variable chamber 10 when in the closed position.

In the load-measuring actuator shown in FIG. 1, the constant-pressure supply 104 of hydraulic fluid may comprise the source 100 of pressurized hydraulic fluid and an accumulator 60. The accumulator 60 may be intermittently coupled to the source 100 of pressurized hydraulic fluid through a second check valve 50. The first and second check valves, respectively 14 and 50, may be coupled by a second flowline 52. The accumulator may be coupled to the second flowline 52. The constant-pressure supply 104 may further comprise a reducing valve 30 for regulating the pressure of the hydraulic fluid. A manual valve 70 may be provided to vent the accumulator 60 when the load-measuring actuator is not in operation.

The first check valve 14 may provide several advantages. First, it may protect the accumulator 60 from excessive pressure levels that may be generated by the load applied to the hydraulic cylinder 12. Second, even if the load applied to the hydraulic cylinder 12 does not generate an excessive pressure level, the check valve 14 may prevent fluid flow out of the variable chamber 10 into the accumulator 60 and may help maintain the hydraulic cylinder 12 in its extended position.

In the example of FIG. 1, the source 100 may not be configured to supply constant pressure to the cap side of the cylinder 12. Instead, the constant-pressure supply may be provided to the cylinder 12 by the accumulator 60 pre-charged with gas at a pressure slightly below that of the source 100. In operation, hydraulic fluid may be intermittently supplied from the source 100 to the accumulator 60 by switching the position of a direction control valve 20. Otherwise, the direction control valve 20 may remain in the neutral position. The check valve 50 may be used to maintain the hydraulic fluid in the accumulator 60 while the source 100 is not engaged. The check valve 50 may thus prevent flow back from the accumulator 60 toward the source 100. The hydraulic fluid in the accumulator 60 may remain at an essentially constant pressure, which is the pre-charging pressure. By connecting the accumulator 60 to the chamber of the hydraulic cylinder 12 via the first and second flowlines, respectively 22 and 52, hydraulic fluid may be supplied to the hydraulic cylinder 12 at the constant pressure level.

The load-measuring actuator shown in FIG. 1 further comprises a pressure sensor 90. The pressure sensor 90 is coupled to the variable chamber by a pressure path 92. The pressure path 92 may couple the pressure sensor 90 to the first flowline 22. Alternatively, the pressure path 92 may couple the pressure sensor 90 to the variable chamber 10.

The load-measuring actuator shown in FIG. 1 further comprises a restricted flow orifice 80. The restricted flow orifice 80 may continuously leak hydraulic fluid from the variable chamber 10. The restricted flow orifice 80 may be coupled to the pressure path 92. Alternatively, the restricted flow orifice 80 may be coupled to variable chamber 10 or the first flowline 22. The restricted flow orifice 80 may comprise a variable orifice valve, such as a needle valve.

The restricted flow orifice 80 may meter sufficiently low leakage rates. Preferably, the restricted flow orifice 80 may permit adjustment of its leakage rate, for example, to account for a dependence of the leakage rate on the ambient temperature, the viscosity of the hydraulic fluid, and/or the operating pressure of the load-measuring actuator. A needle valve may be a preferred embodiment of the restricted flow orifice 80 that meets these characteristics; however, other embodiments may be sufficient, or even optimal, depending on the application of the load-measuring actuator. A fixed orifice valve is an example of an embodiment of a restricted flow orifice 80.

The restricted flow orifice 80 may allow a very low leakage rate from the cap side of the cylinder 12 back to the drain 102. The very low leakage rate may be compensated by supplying hydraulic fluid with the constant-pressure supply 104. Thus, in the absence of fluctuation of the load applied to the cylinder 12, the pressure measured by the sensor 90 remains at the constant pressure level.

The restricted flow orifice 80 may be sized so that the hydraulic fluid is leaked at a rate sufficient to compensate for the expansion of the hydraulic fluid caused by variations in temperature of the hydraulic fluid. Thus, volume increases caused by variations in temperature are discharged through the restricted flow orifice 80 without increasing the pressure in the hydraulic fluid. Moreover, in the absence of fluctuation of the load applied to the cylinder 12, the pressure measured by the sensor 90 remains at the constant pressure level even when environmental temperature increases or heating (e.g., from sunshine) causes thermal expansion of the hydraulic fluid in the cylinder 12.

In contrast with temperature increases, when the load applied to the hydraulic cylinder increases beyond a pre-selected threshold, the hydraulic fluid is leaked at a rate that is preferably insufficient to compensate for the increase of the load applied to the hydraulic cylinder. The pre-selected threshold for the load may correspond to the load that overcomes the constant pressure level supplied to the hydraulic cylinder 12. Thus, when the pressure measured by the sensor 90 exceeds the constant pressure level of the hydraulic fluid supplied to the variable chamber 10, the measured pressure is indicative of an increase of the load applied to the cylinder 12 beyond the pre-selected threshold. Moreover, the measured pressure is not indicative of the thermal expansion of the hydraulic fluid in the cylinder 12.

The leakage rate sufficient to compensate for the expansion of the hydraulic fluid caused by variations in temperature is at least equal to the expansion rate of a particular volume of hydraulic fluid corresponding to the maximum temperature increase rate observable during the day. The particular volume may be the volume of hydraulic fluid trapped in the variable chamber 10 when the hydraulic cylinder 12 is extended. However, the leakage rate may typically be larger than the expansion rate of the particular volume. Reasons for increasing the safety factor may include taking into account expansion in the volume of fluid in the first flowline 22 and the pressure path 92 and taking into account temperature increase rates larger than expected. Reasons for decreasing the safety factor may include excessive drifting of the load-sensing actuator from its extended position caused by insufficient supply of hydraulic fluid at the constant pressure. When a needle valve is used, the leakage rate may be adjusted by trial and error as the needle valve position may depend on various parameters such as the constant pressure level at which hydraulic fluid is supplied, the viscosity of the hydraulic fluid, or the actual temperature increase rate.

As shown in FIG. 1, the load-sensing actuator is configured to sense the load applied to a cylinder when the cylinder is extended. Given the benefit of this disclosure, those having ordinary skills will appreciate that a load-sensing actuator (not shown) may be configured to sense the load applied to the cylinder when the cylinder is retracted. In such cases, the constant-pressure supply, the pressure sensor, and the restricted flow orifice would be connected to the variable chamber located on the rod side of the hydraulic cylinder.

As shown in FIG. 1, the restricted flow orifice 80 is implemented using only one valve. However, the restricted flow orifice 80 may alternatively be implemented using a plurality of valves placed in series or in parallel.

Figure 2:
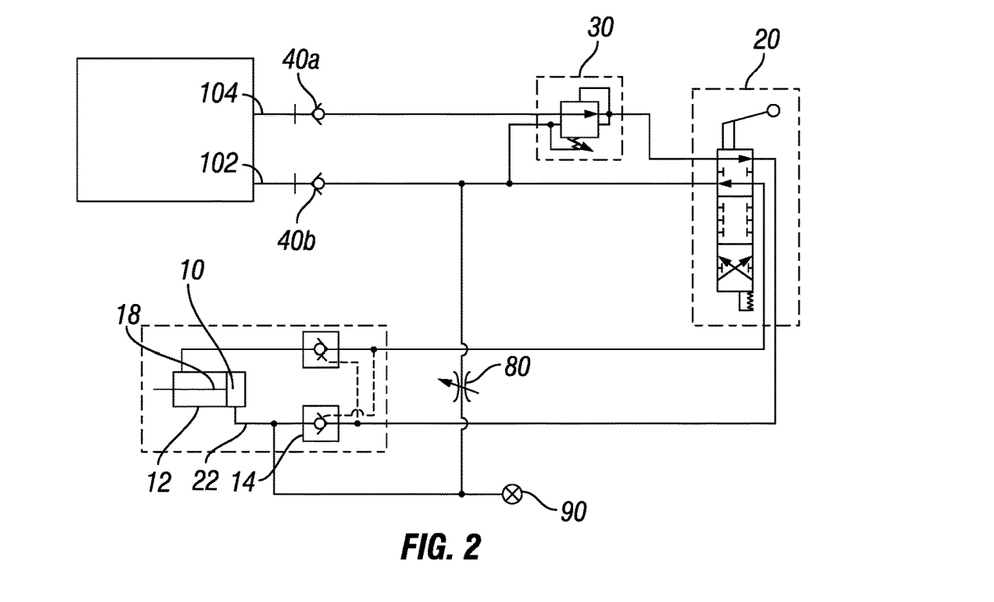
FIG. 2 is a schematic of a simplified hydraulic circuit, including a hydraulic cylinder used as an actuator and a pressure sensor for monitoring a load applied to the hydraulic cylinder, which may be used when an external constant-pressure supply is available.

Turning now to FIG. 2, an example of a simplified load-measuring actuator is illustrated. While the source 100 shown in FIG. 1 may not be configured to supply constant pressure, a constant-pressure supply 104 is made available at the quick-connect 40a in FIG. 2. As such, the accumulator 60 and the second check valve 50 may not be implemented. In addition, the direction control valve 20 may remain in the extend position, that is, in the position coupling the constant-pressure supply 104 to the cap side of the hydraulic cylinder 12 and the drain 102 to the rod side of the hydraulic cylinder 12.

The load-measuring actuator shown in FIG. 1 or 2 may be used to counter the effects of thermal expansion in the hydraulic fluid and more accurately determine the load on hinged structures wherein the structure hinges are actuatable using a hydraulic cylinder. For example, as illustrated in FIGS. 3 and 3A, the load-measuring actuator shown in FIG. 1 or 2 may be used in a coiled tubing injector 200 to more accurately determine the load on a tubing guide 106 of the coiled tubing injector 200.

Figure 3:
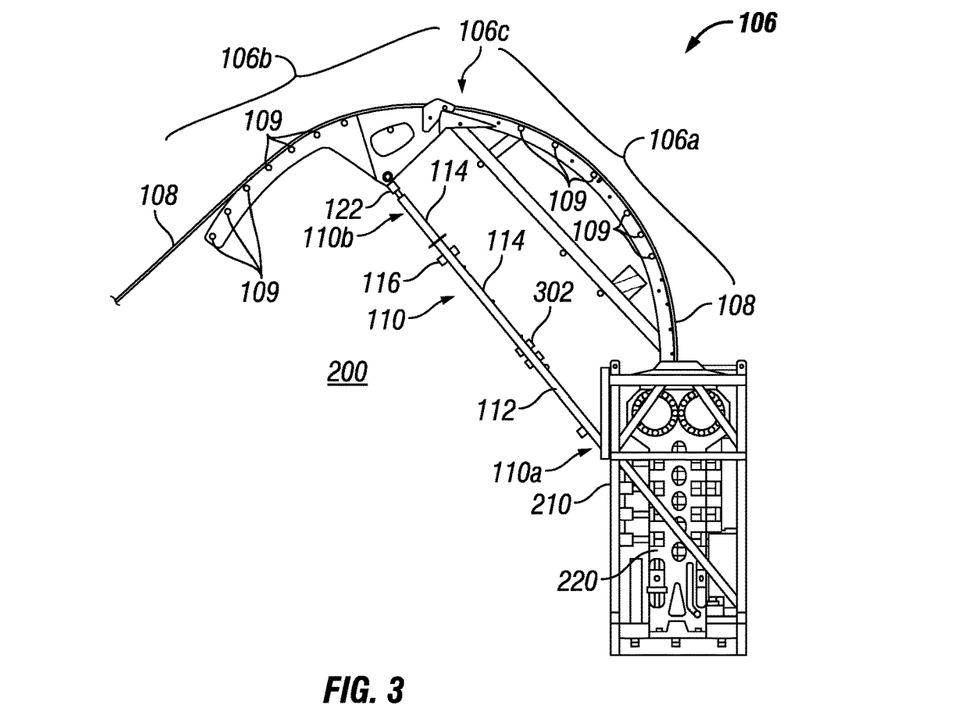
FIG. 3 is a side view of a coiled tubing injector with an arched tubing guide for use at a well head.
Figure 3A:
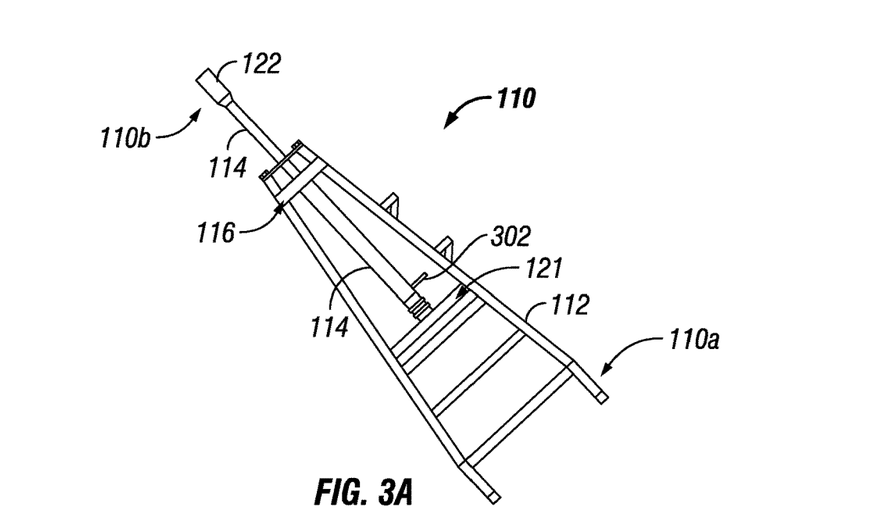
FIG. 3A is a bottom view of a strut from the coiled tubing injector of FIG. 3.

As shown in FIGS. 3 and 3A, the coiled tubing injector 200 comprises an injector head 220 mounted within a cage or frame 210. The frame 210 protects the injector head 220 and allows it to be lifted by a crane or supported on a structure above a wellhead to accommodate a riser extending from the wellhead. A proximal end of the arched tubing guide 106 is coupled to the top of frame 210. Its distal end is free and oriented toward a reel (not shown) on which coiled tubing 108 is wound. The arched tubing guide 106 transitions the coiled tubing 108 between the reel and the top of the injector head 220. A plurality of rollers (not visible, except for the ends of pins 109 on which the rollers are mounted) are spaced along the length of the arched tubing guide 106. The tension on the coiled tubing 108 exerts loads on the arched tubing guide 106.

In the embodiment illustrated in FIGS. 3 and 3A, the arched tubing guide 106 is comprised of two segments, respectively 106a and 106b, so that the coiled tubing injector 200 can be more easily transported. Segment 106a is connected to the top of frame 210. This connection could be rigid or made through a joint that allows for pivoting. Segment 106b is connected to segment 106a by a hinged joint 106c that allows segment 106b to pivot downwardly and inwardly toward the frame 210, for transport. When the coiled tubing injector is rigged, segment 106b is pivoted to operating position.

Also in the illustrated embodiment, a strut 110 supports the arched tubing guide 106 and transfers to frame 210 at least some of the loads generated by tension on the coiled tubing 108. A distal end 110b of the strut 110 is coupled near the distal end of the arched tubing guide 106, preferably along segment 106b. A proximal end 110a of the strut 110 is coupled to frame 210. The coupling at each end of the joint is, in this example, through pivoting joints. The load on the stmt 110 is primarily a compressive force.

Referring to FIG. 3A, the strut 110 may comprise of an "A" shaped frame 112 to aid the transfer of side bending moments to frame 210. Strut 110 further comprises a hydraulic cylinder 114. Connected to a distal end of the hydraulic cylinder 114 is a tang 122 that forms the distal end 110b of the strut 110 and couples to tubing guide 106. In this example, the strut 110 is designed to be collapsible to accommodate the folding of the arched tubing guide 106 by the pivoting of segment 106b. When segment 106b is pivoted up into an operational position, the hydraulic cylinder 114 is pressurized to carry a compressive load. Side forces and bending moments placed on the distal end of the hydraulic cylinder 114 are transferred to the "A" frame 112 by support 116. The pivoting joints at each end 110a and 110b of the strut 110 accommodate its movement. The bottom end of the hydraulic cylinder 114 may be connected to cross member 121 of the "A" frame 112 by a clevis and pin capable of carrying side loads.

The strut 110 makes use of a pressure sensor 302 connected to a port on hydraulic cylinder 114. The pressure sensor 302 generates a signal that is transmitted back to remotely located electronics components. The signal is indicative of the axial or compressive load on the strut 110, which is turn is caused by the load exerted on the tubing guide 106 by tension of the coiled tubing 108. The electronic components may be configured to interpret and remotely display the signal from the pressure sensor 302. For example, the electronic components may be configured to detect whether the measured pressure exceeds the constant pressure level of the hydraulic fluid supplied to the hydraulic cylinder 114 and to convert the excess pressure into a compressive load corresponding to the measured pressure.

Additional consideration may be given to three design features: the reference pressure level in the cylinder 114 that would overcome the maximum load to which the tubing guide 106 is rated, the selection of the constant pressure supplied to the hydraulic cylinder 114, and the maximum pressure ratings of the cylinder 114 and pressure sensor 302.

For example, the cylinder 114 may be sized so that at the tubing guide's rated load, the pressure in the cylinder (referred to as the reference pressure level) is 3,000 psi.

The pressure level provided by the constant-pressure supply 104 (in FIG. 1 or 2) to extend the cylinder 114 and may be selected at 1,500 psi, which is preferably sufficient to raise the tubing guide 106 into place before operation of the coiled tubing injector 200. In this example, when the load on the tubing guide 106 exceeds 50% of the rated load of the tubing guide, the pressure in the cylinder 114 would begin increasing beyond the 1,500 psi pressure, and the pressure sensor 302 would begin indicating the compressive load on the strut 110 and/or the load on the tubing guide 106. More generally, the pressure level supplied by the constant-pressure supply 104 may be selected between 50% and 80% of the reference pressure level.

The cylinder 114 and pressure sensor 302 may be designed for a maximum pressure rating. The maximum pressure rating may typically be larger than the reference pressure level, for example, 5,000 psi. Thus, the cylinder 114 and pressure sensor 302 may have additional safe sensing range beyond the maximum allowed load (i.e., 3,000 psi pressure in the cylinder 114 and 100% of the load rating of the tubing guide 106) to continue sensing in an overload condition. The maximum pressure rating also ensures that structural failure of the tubing guide 106 occurs before failure of the cylinder 114.

Figure 4:
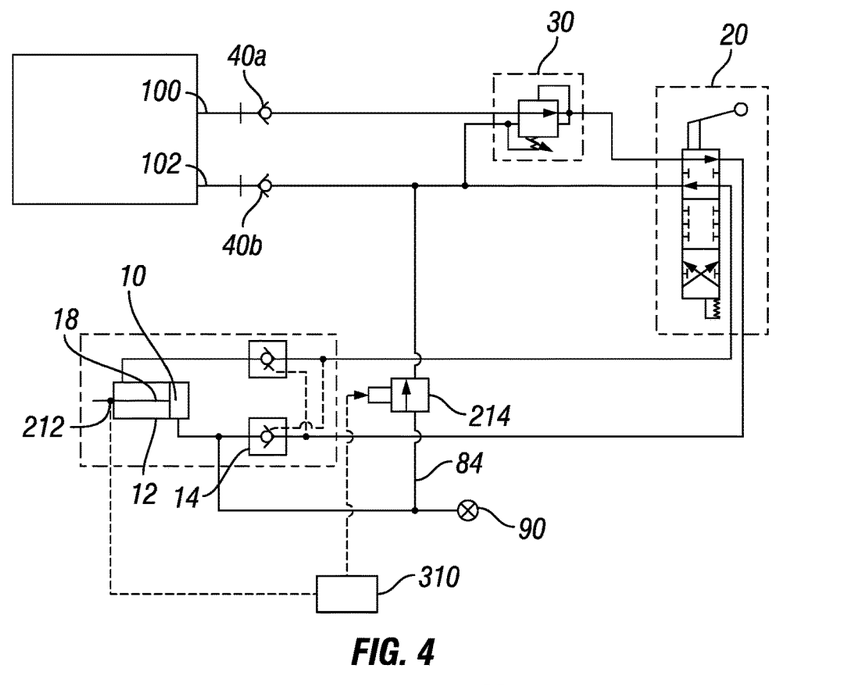
FIG. 4 is a schematic of another hydraulic circuit, including a hydraulic cylinder used as an actuator, a pressure sensor for monitoring a load applied to the hydraulic cylinder, and a course-limiting feature comprising a position sensor, a valve, and a controller.

Turning now to FIG. 4, another example of a load-measuring actuator is illustrated. Similar to the examples shown in FIGS. 1 and 2, the load-measuring actuator of FIG. 4 includes a hydraulic cylinder 12. The hydraulic cylinder 12 has a variable chamber 10. The variable chamber 10 is delimited by a piston 18 reciprocally disposed in the hydraulic cylinder 12. The variable chamber 10 may be located on the cap side of the hydraulic cylinder 12.

However, the load-measuring actuator of FIG. 4 comprises a course-limiting feature, further described below, configured to leak hydraulic fluid from the variable chamber 10 and avoid the piston 18 traveling full stroke to its end-of-stroke position. In particular, the thermal expansion of the hydraulic fluid in the chamber 10 may not cause the piston 18 to reach the end-of-stroke position. The course-limiting feature is further configured to stop leaking hydraulic fluid from the variable chamber 10 when operating in normal conditions. Therefore, the load-measuring actuator of FIG. 4 may not require a constant-pressure supply of hydraulic fluid, and a source 100 of pressurized hydraulic fluid that does not attenuate pressure fluctuations may suffice.

In the embodiment illustrated in FIG. 4, the course-limiting feature comprises a flowpath 84 capable of leaking hydraulic fluid from the variable chamber 10 to a drain 102, and an obturator operatively coupled to the piston 18. As used herein, the obturator normally closes the flowpath 84. The obturator comprises a position sensor 212, a valve 214, and a controller 310. The position sensor 212 may be operatively coupled to the piston 18 to measure a position of the piston 18 relative to the cylinder 12. The valve 214 may be located in the flowpath 84 to control the flow of hydraulic fluid from the variable chamber 10. The valve 214 may be of a type normally-closed, pilot-to-open. The controller 310 may be configured to actuate the valve 214 when the position sensor 212 indicates that the piston 18 is located between a first position, which is recessed from an end-of-stroke position of the piston by a relatively small distance compared to the full stroke (e.g., 10% or less), and the end-of-stroke position. Accordingly, when the cylinder 12 is being extended but has not reached the first position, as well as during operation in normal conditions, the controller 310 may be configured to keep the flowpath 84 closed with valve 214. The controller 310 may further be configured to open the flowpath 84 when the piston 18 is located between the first position and the end-of-stroke position of the piston 18.

In operation, hydraulic fluid may be supplied from the source 100 to the variable chamber 10 of the hydraulic cylinder 12 to move the piston 18 toward an end-of-stroke position of the piston 18 while the valve 214 closes the flowpath 84. The position of the piston 18 may be continuously measured by the sensor 212, and communicated to the controller 310 for processing. The controller 310 may selectively open the flowpath 84 based on a comparison between the measured position of the piston 18 and the first position by actuating the valve 214 to its open position. When the valve 214 is open, the hydraulic fluid may leak from the variable chamber 10 into the drain 102. The hydraulic fluid may leak from the variable chamber 10 as long as the piston 18 is located between the first position and the end-of-stroke position. When hydraulic fluid has sufficiently leaked, and the piston position leaves the interval between the first position and the end-of-stroke position, the flowpath 84 may be closed by releasing the valve 214 to its normally-closed position.

In cases where environmental temperature increases or heating (e.g., from sunshine) causes thermal expansion of the hydraulic fluid in the variable chamber 10, the thermal expansion is compensated by movement of the piston 18 toward its end-of-stroke position, and possibly by leakage of hydraulic fluid, without spurious increase in pressure of the hydraulic fluid in the variable chamber 10. As such, the pressure measured in the variable chamber 10 remains related to the load applied to the load-measuring actuator, which therefore behaves like a load cell.

Figure 5:
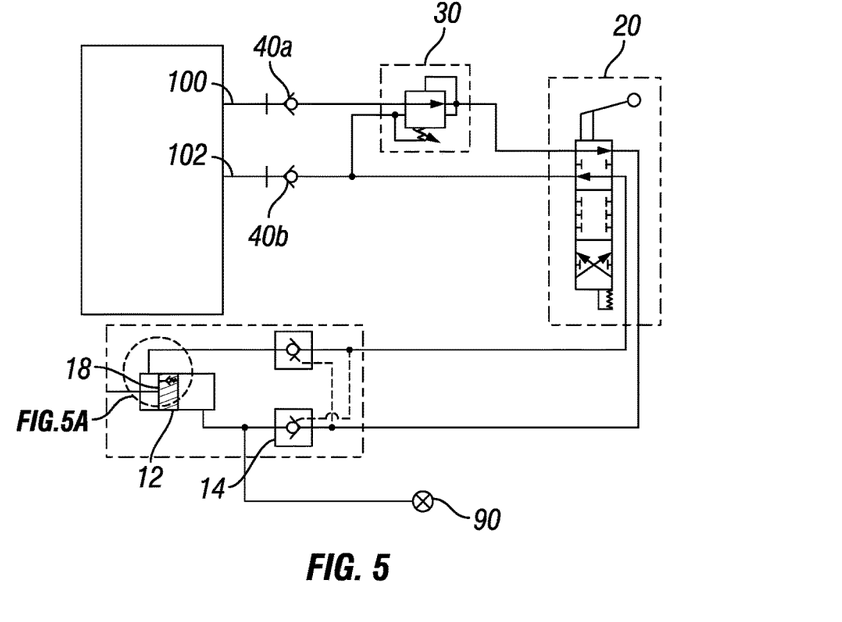
FIG. 5 is a schematic of another hydraulic circuit, including a hydraulic cylinder used as an actuator and a pressure sensor for monitoring a load applied to the hydraulic cylinder, and a course-limiting feature comprising a check valve integrated into the piston of the hydraulic cylinder and a pin formed in the hydraulic cylinder.
Figure 5A:
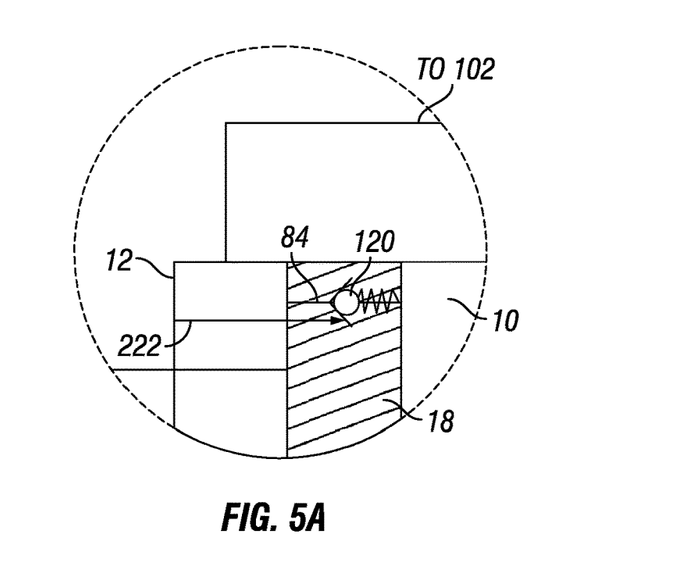
FIG. 5A is a schematic of a portion of the hydraulic circuit shown in FIG. 5.

In the embodiment of FIGS. 5 and 5A, the flowpath 84 extends through the piston 18. The obturator comprises a check valve 120 biased to close the flowpath 84. The check valve 120 may be integrated into the piston 18. The obturator also includes a pin 222 formed in the cylinder 12 and sized to press against the check valve 120 when the piston 18 is located between the first position and the end-of-stroke position or the piston. When pressed against the check valve 120, the pin 222 opens the check valve 120 and the flowpath 84 to leak hydraulic fluid from the variable chamber 10.

Figure 6:
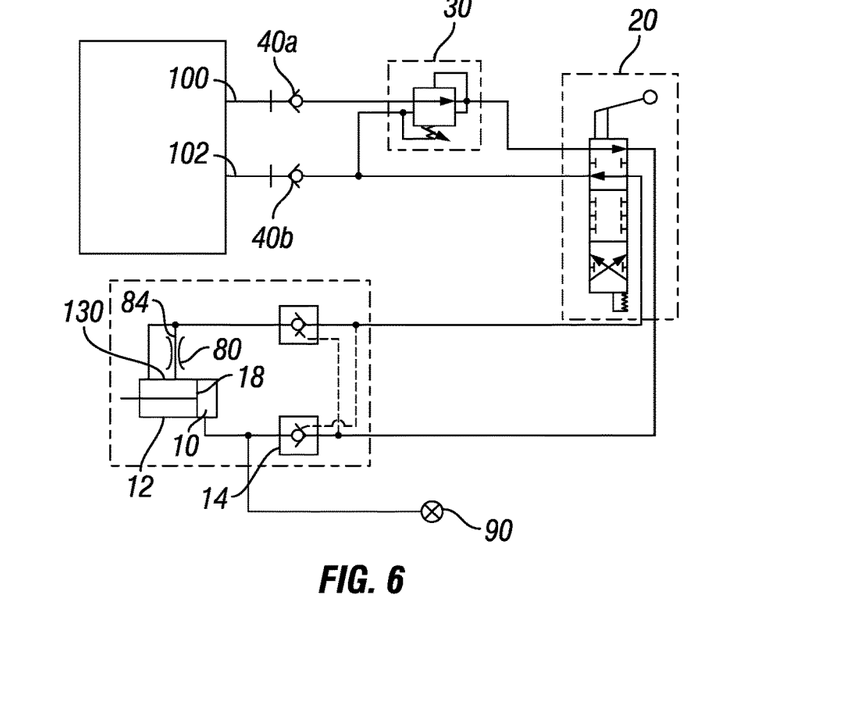
FIG. 6 is a schematic of another hydraulic circuit, including a hydraulic cylinder used as an actuator, a pressure sensor for monitoring a load applied to the hydraulic cylinder, and a course-limiting feature comprising seal carried by the piston of the hydraulic cylinder for sealing a port located on a wall of the hydraulic cylinder.

In the embodiment of FIG. 6, the flowpath 84 is provided through a wall of the cylinder 12 and leads to port 130 that is flush with the wall of the cylinder 12. The obturator comprises a seal carried by the piston 18. The seal seals the port 130 from to hydraulic fluid in the variable chamber 10 when the piston 18 is not located between the first position and the end-of-stroke position. The port 130 is exposed to hydraulic fluid in the variable chamber 10 when the piston 18 is located between the first position and the end-of-stroke position.

To move the piston 18 toward the end-of-stroke position during operation, the flowpath 84 is initially sealed from to the hydraulic fluid in the variable chamber by the seal provided on the piston 18. To leak the hydraulic fluid from the variable chamber 10 when the piston 18 is located between the first position and the end-of-stroke position, the port 130 becomes exposed to the hydraulic fluid in the variable chamber 10 after the piston passes over the port 130, and the flowpath 84 is connected to the variable chamber 10.

While the disclosure is susceptible to various modifications and alternative forms, specific embodiments thereof are shown by way of example in the drawings and description. It should be understood, however, that the drawings and detailed description thereto are not intended to limit the disclosure to the particular form disclosed, but on the contrary, the intention is to cover all modifications, equivalents and alternatives falling within the spirit and scope of the disclosure.

What is claimed is:

1. A method of monitoring a load applied to a hydraulic cylinder, wherein the hydraulic cylinder is used as an actuator, the method comprising:
supplying a hydraulic fluid at a constant pressure to a chamber of the hydraulic cylinder through a check valve;
trapping the hydraulic fluid in the chamber behind the check valve;

leaking the hydraulic fluid from the chamber at a leakage rate sufficient to compensate for expansion of the hydraulic fluid caused by variations in temperature of the hydraulic fluid, wherein the hydraulic fluid trapped behind the check valve is continuously leaked from the chamber; and measuring the pressure of the hydraulic fluid in the chamber using a pressure sensor.

2. The method of claim 1, wherein supplying the hydraulic fluid to the chamber of the hydraulic cylinder comprises:

intermittently supplying the hydraulic fluid from a source to an accumulator;

preventing flow back from the accumulator toward the source; and connecting the accumulator to the chamber of the hydraulic cylinder to supply the hydraulic fluid at the constant pressure.

3. The method of claim 1, wherein measuring the pressure of the hydraulic fluid in the chamber comprises:

measuring the pressure of the hydraulic fluid trapped behind the check valve.

4. The method of claim 1, wherein continuously leaking the hydraulic fluid from the chamber comprises flowing the hydraulic fluid through a restricted flow orifice.

5. The method of claim 4, further comprising:

adjusting the flow of hydraulic fluid through the restricted flow orifice.

6. The method of claim 1, wherein continuously leaking the hydraulic fluid comprises flowing the hydraulic fluid through a needle valve.

7. The method of claim 1, further comprising:

detecting whether the measured pressure exceeds the constant pressure of the hydraulic fluid supplied to the chamber.

8. A load-measuring actuator including a hydraulic cylinder having a variable chamber comprising:

a pressure sensor coupled to the variable chamber by a pressure path;

a restricted flow orifice leaking hydraulic fluid from the variable chamber; and a constant-pressure supply of a hydraulic fluid connected to the variable chamber through a first check valve, wherein the first check valve allows supplying a hydraulic fluid into the variable chamber through the first check valve and prevents flow of the hydraulic fluid out of the variable chamber through the first check valve when in a closed position, wherein the first check valve is directly coupled to the variable chamber via a flowline, and wherein the restricted flow orifice is directly coupled to one of the variable chamber, the flowline, and the pressure path.

9. The load-measuring actuator of claim 8, wherein:

the variable chamber is located on the cap side of the hydraulic cylinder;

the first check valve is a normally-closed, pilot-to-open check valve; and the pressure path directly couples the pressure sensor to one of the variable chamber and the flowline.

10. The load-measuring actuator of claim 8, wherein the restricted flow orifice comprises a variable orifice valve.

11. The load-measuring actuator of claim 8, wherein the restricted flow orifice comprises a needle valve.

12. The load-measuring actuator of claim 8, wherein the constant-pressure supply of hydraulic fluid comprises:

a source of pressurized hydraulic fluid; and an accumulator intermittently coupled to the source of pressurized hydraulic fluid through a second check valve.

13. The load-measuring actuator of claim 12, wherein the first and second check valves are directly coupled by a flowline, and the accumulator is directly coupled to the flowline.

14. The load-measuring actuator of claim 8, wherein the restricted flow orifice continuously leaks hydraulic fluid from the variable chamber.

15. A load-measuring actuator including a hydraulic cylinder having a variable chamber comprising:

a pressure sensor coupled to the variable chamber by a pressure path;

a flowpath capable of leaking a hydraulic fluid from the variable chamber; and an obturator operatively coupled to a piston, wherein the obturator is configured to open the flowpath when the piston is located between a first position and an end-of-stroke position, wherein thermal expansion of hydraulic fluid in the chamber does not cause the piston to reach the end-of-stroke position.

16. The load-measuring actuator of claim 15, wherein the obturator comprises:

a position sensor operatively coupled to the piston to measure a position of the piston;

a valve located in the flowpath to control flow of hydraulic fluid from the variable chamber; and a controller actuating the valve when the position sensor indicates that the piston is located between the first position and the end-of-stroke position.

17. The load-measuring actuator of claim 15, wherein:

the flowpath extends through the piston, and the obturator comprises a check valve biased to close the flowpath, and a pin formed in the cylinder and sized to press against the check valve when the piston is located between the first position and the end-of-stroke position.

18. The load-measuring actuator of claim 15 wherein the obturator comprises:

a seal carried by the piston; and a port located on a wall of the cylinder and leading into the flowpath, wherein the seal seals the port from to hydraulic fluid in the variable chamber when the piston is located between the first position and the end-of-stroke position, and the port is exposed to hydraulic fluid in the variable chamber when the piston is located between the first position and the end-of-stroke position.

19. The load-measuring actuator of claim 15 wherein the first position is recessed from the end-of-stroke position of the piston.

* * * * *

UNITED STATES PATENT AND TRADEMARK OFFICE
CERTIFICATE OF CORRECTION

PATENT NO.        : 10,352,805 B2
APPLICATION NO.   : 15/334981
DATED             : July 16, 2019
INVENTOR(S)       : Timothy S. Steffenhagen and William Benjamin White Page 1 of 1

It is certified that error appears in the above-identified patent and that said Letters Patent is hereby corrected as shown below:

In the Claims

Column 12, Claim 18, Line 6, "from to hydraulic fluid" should read --from hydraulic fluid--; Line 7, "when the piston is located" should read --when the piston is not located--.

Signed and Sealed this
Third Day of September, 2019

Andrei Iancu
*Director of the United States Patent and Trademark Office*